US007284121B2

(12) United States Patent
Williams et al.

(10) Patent No.: US 7,284,121 B2
(45) Date of Patent: Oct. 16, 2007

(54) SYSTEM AND METHOD FOR TRANSMITTING REDUCED INFORMATION FROM A CERTIFICATE TO PERFORM ENCRYPTION OPERATIONS

(75) Inventors: Roy Williams, Redmond, WA (US); Jorge Pereira, Seattle, WA (US); Karim Michel Batthish, Seattle, WA (US); Phillip J. Hallin, Port Townsend, WA (US); Yu Lin Sie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 824 days.

(21) Appl. No.: 10/462,117

(22) Filed: Jun. 13, 2003

(65) Prior Publication Data

US 2004/0096055 A1   May 20, 2004

Related U.S. Application Data (60) Provisional application No. 60/428,080, filed on Nov. 20, 2002.

(51) Int. Cl.
G06F 15/16 (2006.01)
(52) U.S. Cl. ...................... 713/156; 380/277; 380/283; 709/206; 455/414.1
(58) Field of Classification Search ................ 713/156; 380/277, 283; 709/206; 455/414.1
See application file for complete search history.

(56) References Cited

U.S. PATENT DOCUMENTS 6,192,131 B1 * 2/2001 Geer et al. .................. 380/283

6,615,347 B1 * 9/2003 de Silva et al. ............. 713/156
6,760,752 B1 * 7/2004 Liu et al. .................... 709/206
2005/0148323 A1 * 7/2005 Little et al. ............... 455/414.1

OTHER PUBLICATIONS

Zao et al., "A Public-Key based Secure Mobile IP", Wireless Networks 5 (1999), pp. 373-390.*
Halevi et al., "Public-Key Cryptography and Password Protocols", ACM Transaction on Information and System Security, vol. 2, No. 3, Aug. 1999.*
Lai, M.K.E., et al., "A Mobile Subscriber Proxy Preserving Writer-To-Reader Message Security" Military Communications Conference, 1996. Oct. 21-24, 1996, pp. 461-467.
Menezes, et al., "Handbook of 1-28 Applied Cryptograph" CRC Press Series on Discrete Mathematics and its Applications, 2997, pp. 27-28, 37-39,547-549, 551-553, 555-556, 576-577.
Certificate Based PKI and B2B E-Commerce: Suitable Match or Not? Kok Ming Ang and William J. Caelli Information Security Research Centre, School of Data Communications p. 20-34, 2001.
A Step Ahead in the Directory Authentication Framework Francisco Jordan, Manuel Medina, Juan Carlos Cruellas and Isabel Callego 1994 IFIP p. 89-106.

* cited by examiner

Primary Examiner—Taghi Arani
(74) Attorney, Agent, or Firm—Workman Nydegger (57) ABSTRACT A certificate-based encryption mechanism in which a source client does not access the entire certificate corresponding to a destination client when encrypting an electronic message to be sent to the destination client. Instead, the source client only requests a portion of the certificate from a certificate server. That portion includes encryption information, but may lack some or even all of the self-verification information in the certificate. The certificate server preferably performs any validation of the certificate prior to sending the encryption information to the source client. The certificate need not be separately validated by the source client, especially if the certificate server is trusted by the source client.

36 Claims, 5 Drawing Sheets

SYSTEM AND METHOD FOR TRANSMITTING REDUCED INFORMATION FROM A CERTIFICATE TO PERFORM ENCRYPTION OPERATIONS

CROSS REFERENCE TO RELATED APPLICATIONS

The present applicant claims the benefit of provisional U.S. patent No. 60/428,080 filed Nov. 20, 2002, and entitled "System and Method for Transmitting Reduced Information from a Certificate to Perform Encryption Operations".

BACKGROUND OF THE INVENTION

1. The Field of the Invention

The present invention relates to secure communications. More particularly, the present invention relates to the use of certificates for encryption of communications.

2. Background and Related Art

Computing and networking technology has transformed the way we work and play. Networks have become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "source computing system" or "source client") constructs or otherwise accesses an electronic message and transmits the electronic message over a network to another computing system (referred to herein as a "destination computing system" or "destination client"). The electronic message may be read by a human user as when the electronic message is an e-mail or instant message, or may be read, instead, by an application running on the receiving computing system. The electronic message may be constructed by an application running on the sending computing system with the possible assistance of a human user.

Although such electronic messaging advantageously allows for computing systems to exchange information and thereby serve their associated users in ways not before known, the electronic messages are subject to interception. Depending on the sensitivity of the content of the electronic message, this could be quite harmful, and even catastrophic in some cases. In order to guard against interception, the electronic messages are often encrypted such that only those having a certain binary sequence (called a "key") may decrypt the electronic message to thereby access the information represented in the electronic message. Efforts are exerted such that hopefully only the receiving computing system has access to the key needed to decrypt the electronic message. Accordingly, any intervening interceptor would only have access to the encrypted form of the electronic message absent extraordinarily extreme efforts.

In symmetric encryption, the same key that is used to encrypt an electronic message may be used to decrypt the electronic message. In asymmetric encryption, a "public key" and a "private key" are associated with a particular computing system. The public key is made known to a wide variety of computing systems while the private key is not disseminated. The private key may be used to decrypt any messages that are encrypted using the public key. The private key is more sensitive than the public key since the receiving computing system should be the only computing system able to decrypt electronic messages intended for that computing system.

Figure 8:
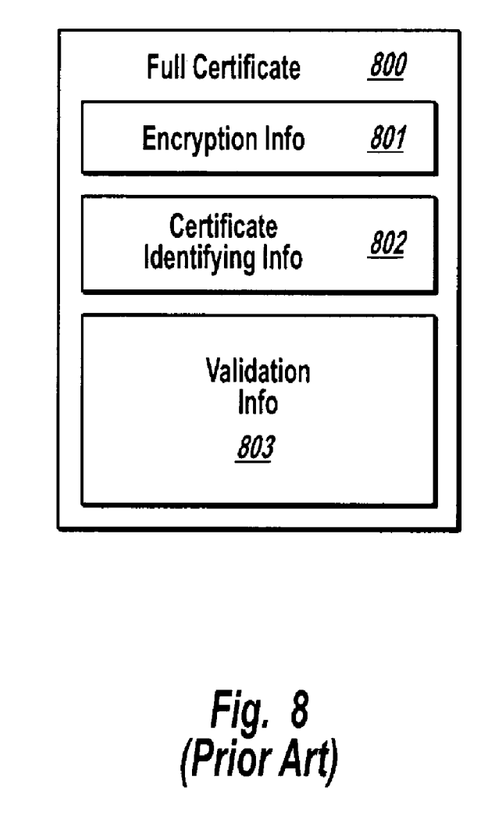
FIG. 8 illustrates a data structure of a full certificate including self-validation information in accordance with the prior art.

In order to facilitate encryption, the sending computing system often accesses an electronic certificate associated with the receiving computing system. FIG. 8 illustrates a data structure of a certificate 800 in accordance with the prior art. The certificate 800 includes validation information 803. The validation information 803 allows a sending computing system to validate that the certificate does indeed correspond to the receiving computing system and that the certificate has not been revoked. An X.509 certificate is one type of certificate that is now in widespread use. The validation information of an X.509 certificate may include, for example, a URL that may be accessed to verify whether or not the certificate does corresponding to the destination computing system. The validation information of an X.509 certificate may also include a certificate revocation list to indicate whether or not the certificate has been revoked.

The certificate 800 also includes certificate identifying information 802 that allows the sending computing system to identify the certificate. For example, an X.509 certificate might include, for example, a key identifier or perhaps the combination of an issuer identifier and a serial number.

The certificate 800 also includes encryption information 801 (e.g., a public key in an X.509 certificate). The encryption information allows the sending computing system to encrypt the electronic message in a manner that may be decrypted by the destination computing system corresponding to the certificate. For example, when the sending computing system encrypts an electronic message using a public key corresponding to the destination computing system, the destination computing system will ideally be the only computing system having the corresponding private key needed to decrypt the electronic message.

There are significant cases when the certificate is used at the point of encryption. For example, conventionally when encrypting e-mail that uses S/MIME, the certificate for the receiving computing system is used at the sending computing system itself in order to aid the sending computing system in performing encryption. MIME (Multipurpose Internet Mail Extensions is a specification for formatting non-ASCII messages so that they can be sent over the Internet. Many e-mail clients now support MIME, which enables them to send and receive graphics, audio, and video files via the Internet mail system. MIME was defined in 1992 by the Internet Engineering Task Force (IETF). S/MIME is a standard that defines a way to encrypt and encode contents of e-mail messages that are conformant to the MIME standard. S/MIME is based on the public-key encryption technology described above. It is expected that S/MIME will be widely implemented, which will make it possible for people to send secure e-mail message to one another, even if they are using different e-mail applications.

There are some potential impediments to widespread adoption and utilization of the certificate-based encryption technology such as that defined by S/MIME, particularly on limited-memory mobile devices. Currently, in order to encrypt a message in certificate-based encryption, the entire certificate is accessed. An X.509 certificate may often be well over 1 kilobyte in size for each certificate. A certificate is conventionally used for each potential recipient of the message. Some messages may have numerous recipients, thereby increasing the amount of memory needed to store the certificates. This could significantly slow performance when working on a mobile device which typically has relatively restricted memory and processor capability.

Furthermore, the sending computing system often acquires the certificates from another computing system over a high latency and/or low bandwidth connection (e.g., a dial-up or wireless connection. In particular, certificates are often stored in centralized repositories or directories for access by e-mail users. The size of a certificate greatly impacts e-mail users who are connected to these repositories over slow network connections. Thus, what would be advantageous is a certificate-based encryption technology that reduces memory, processor, and bandwidth requirements.

BRIEF SUMMARY OF THE INVENTION

The foregoing problems with the prior state of the art are overcome by the principles of the present invention which are directed towards a certificate-based encryption mechanism in which the full certificate is not used at the point of encryption thereby preserving the memory and processor resources at the point of encryption. Furthermore, when the point of encryption does not already have access to the certificate, less than all of the certificate is transmitted to the point of encryption thereby preserving bandwidth (and memory) as compared to transmitting (and storing) the entire certificate.

The principles of the present invention may be implemented in a network environment in which a source client is the point of encryption for an electronic message that is to be transmitted to one or more destination clients. A certificate may be accessed from a certificate server that provides corresponding certificates for at least some of the potential destination clients for the electronic message. A certificate includes encryption information that allows one having access to the certificate to encrypt an electronic message in a manner that may be decrypted by the entity corresponding to the certificate. The certificate also include self-verification information that allows one having access to the certificate to verify that the certificate is valid, that the certification does belong to the corresponding entity, and that the certificate has not been revoked.

The source client accesses the electronic message to be transmitted to a destination client, and then determines that the electronic message is to be encrypted. The source client generates a request to access only a portion of a certificate corresponding to the destination client. The portion includes the encryption information, but may lack some or even all of the self-verification information. The source client then sends the request to the certificate server, which receives the request and in response returns only the requested portion of the certificate.

The portion of the certificate returned may be much smaller than the certificate as a whole. Accordingly, returning just that requested portion significantly reduces the bandwidth required between the certificate server and the source client. When the source client receives the response, the encryption information is used to encrypt the electronic message so that it may be decryptable by the destination client.

The encryption process may include using a public key to directly encrypt the content of the electronic message. Alternatively, when multiple destination clients are to receive the message, the content of the electronic message may be encrypted with another key (e.g., a session key). The electronic message may also include, for each destination client, the session key encrypted with its corresponding public key.

Accordingly, since less than the entire certificate is transmitted and used for encryption, memory and processing resources at the source client are preserved. This is particularly critical if the source client is a mobile device that already has limited processor and memory resources, and often has a limited bandwidth connection with other networks. The present invention is more particularly useful if timing as well as security of the electronic message is important.

Note that some self-verification information of the certificate may not be included in the requested portion of the certificate. In order to preserve the security associated with being able to verify the validity of a certificate, the certificate verification may be performed by the certificate server. The certificate server is preferably already trusted by the source client to the extent that if the certificate server performs such validation, then the source client will conclude that the certificate is valid without independently validating the certificate.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a certificate-based encryption mechanism in which a source client does not access the entire certificate corresponding to a destination client when encrypting an electronic message to be sent to the destination client. Instead, the source client only requests a portion of the certificate from a certificate server. That portion includes encryption information, but may lack some or even all of the self-validation information in the certificate. If validation is implemented, the certificate server performs any validation of the certificate prior to sending the encryption information to the source client. The certificate need not be separately validated by the source client, especially if the certificate server is trusted by the source client.

The source client uses the more limited portions of the certificate (which may be referred to herein as a "mini-certificate" or a "partial certificate"), to encrypt the message. Since the partial certificate is far smaller than the full certificate, this reduces the memory and processor resources used to perform certificate-based encryption, and also reduces the bandwidth requirements between the certificate server and the source client.

The embodiments of the present invention may include a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The computer-readable media may be persistent memory or may be run-time memory or a combination thereof.

Figure 1:
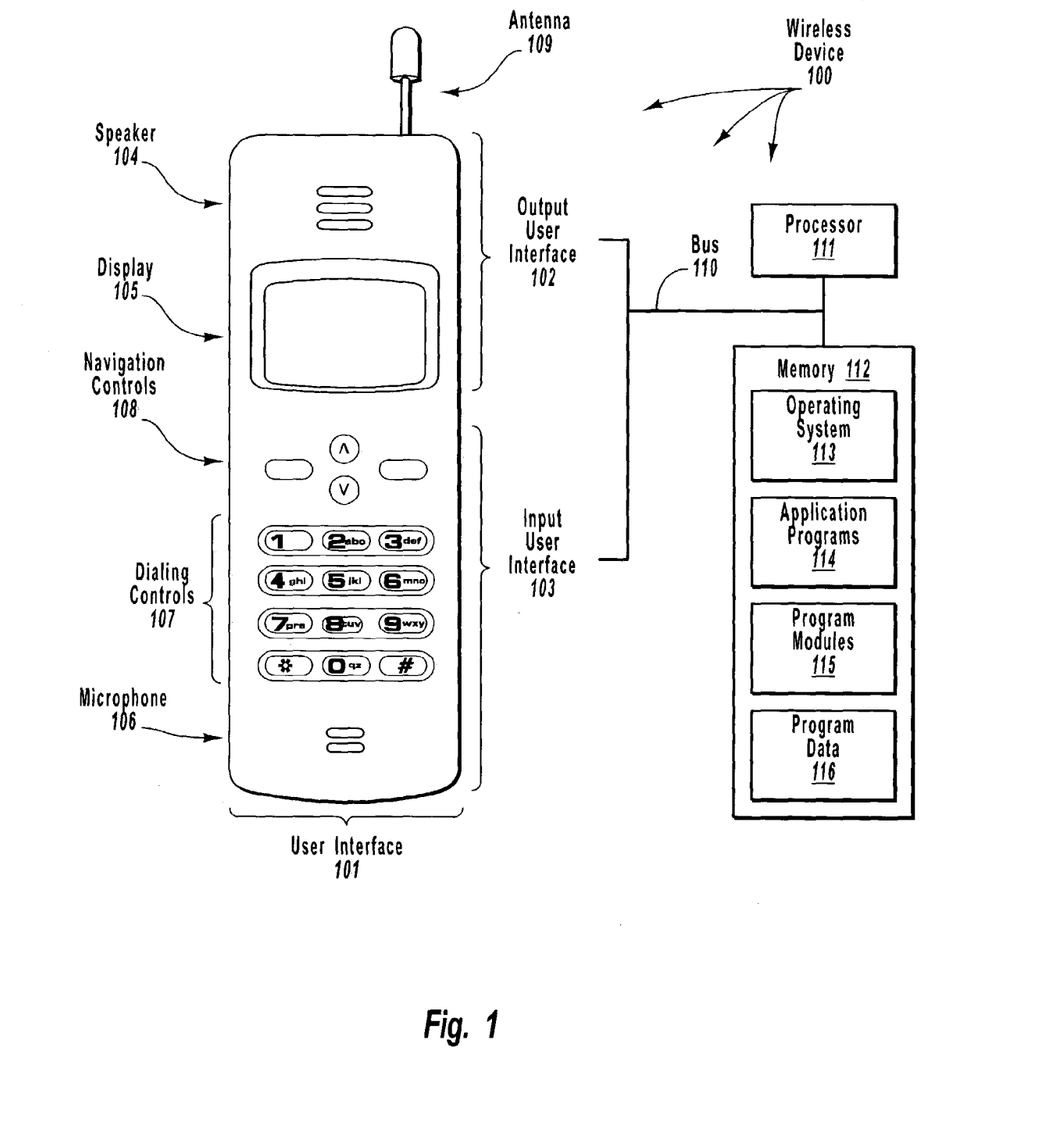
FIG. 1 illustrates a suitable wireless device that may implement the features of the present invention.

FIG. 1 and the following discussion are intended to provide a brief, general description of a suitable computing environment in which the invention may be implemented. Although not required, the invention will be described in the general context of computer-executable instructions, such as program modules, being executed by computing devices. Generally, program modules include routines, programs, objects, components, data structures, and the like that perform particular tasks or implement particular abstract data types.

With reference to FIG. 1, a suitable operating environment for the principles of the invention includes a general purpose computing device in the form of a wireless device 100. Although the wireless device 100 has the appearance of a mobile telephone, a wide-variety of devices are now capable of communicating over a wireless network and may benefit by employing the principles of the present invention. For example, laptop computers, tablet PCs, Personal Digital Assistants (PDAs), and other wireless devices are now available. Other wireless device forms may be developed in the future. The principles of the present invention are not limited to the particular form of the wireless device.

The wireless device 100 includes a user interface 101 for allowing a user to input information through an input user interface 103. The user reviews information presented via an output user interface 102. The user interface will vary widely depending on the form factor of the wireless device. In the illustrated embodiment, however, in which the wireless device 100 is a laptop computer, the output user interface 102 includes a speaker 104 for presenting audio information to the user, as well as a display 105 for presenting visual information to the user.

The input user interface 103 may include a microphone 106 for rendering audio information into electronic form. In addition, the input user interface 103 includes dialing controls 107 and navigation controls 108 that allow the user to input information into the wireless device 100.

Program code means comprising one or more program modules may be stored in a memory 112. The one of more program modules may include an operating system 113, one or more application programs 114, other program modules 115, and program data 116. The one or more program modules may be instantiated in the memory (if volatile), or loaded from memory (if non-volatile) and then further processed using a processor 111. The program code means may include non-volatile as well as volatile memory and its form may vary greatly depending on the type of wireless device.

While FIG. 1 represents a suitable operating environment for the present invention, the principles of the present invention may be employed in any wireless device that is capable of communicating over a wireless network. The wireless device illustrated in FIG. 1 is illustrative only, and by no means represents even a small portion of the wide variety of environments in which the principles of the present invention may be implemented.

Figure 2:
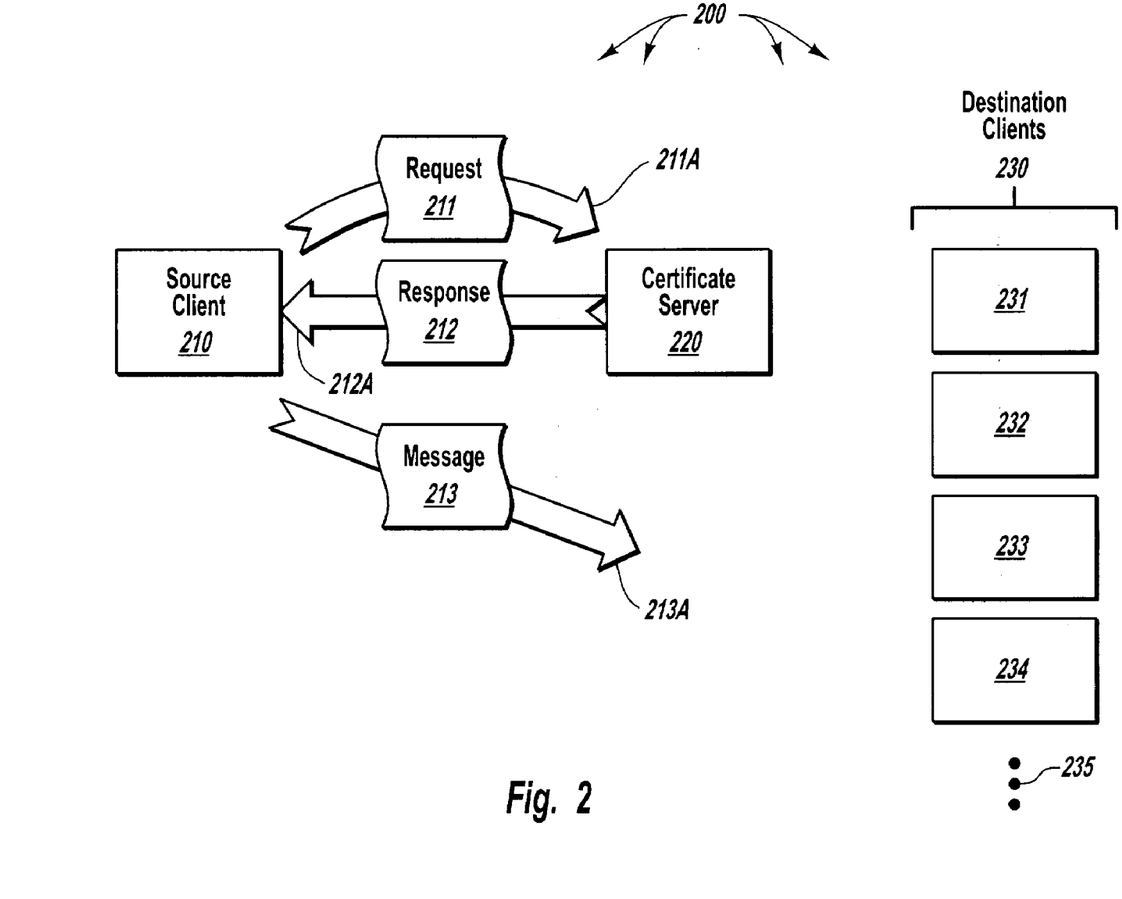
FIG. 2 illustrates a suitable network environment in which the principles of the present invention may be employed including a source client using information from the certificate server to encrypt electronic messages to be sent to destination clients.

FIG. 2 illustrates a network environment 200 in which the principles of the present invention may be employed. The network environment 200 includes a source client computing system 210. In this description and in the claims, a "computing system" is any hardware component or combination of hardware components that is or capable of executing software using one or more processors. The computing system may be a system or a device that has processing capability. A computing system may be, for example, a laptop computer, a desktop computer, a tablet computer, a Personal Digital Assistant (PDA), a mobile telephone, or any other processing system or device whether now existing, or whether to be developed in the future.

In this description and in the claims a "client computing system" or "client" is any computing system that receives the services of another computing system, whether or not that client computing system also provides services to other computing systems. For example, source client 210 receives the services of certificate server 220, which operates to provide certificates (or portions thereof) to source client 210 as needed. In the example, source client 210 accesses (whether or not it also created the electronic message) an electronic message that is to be sent to one of more destination clients 230 including any one of destination clients 231, 232, 233, 234, amongst potentially many more as represented by the vertical ellipses 235. The source client 210 and destination clients 231, 232, 233 and 234 may be configured as described above for wireless device 100 or may take any other form that falls within the definition of computing system set forth herein.

Figure 3:
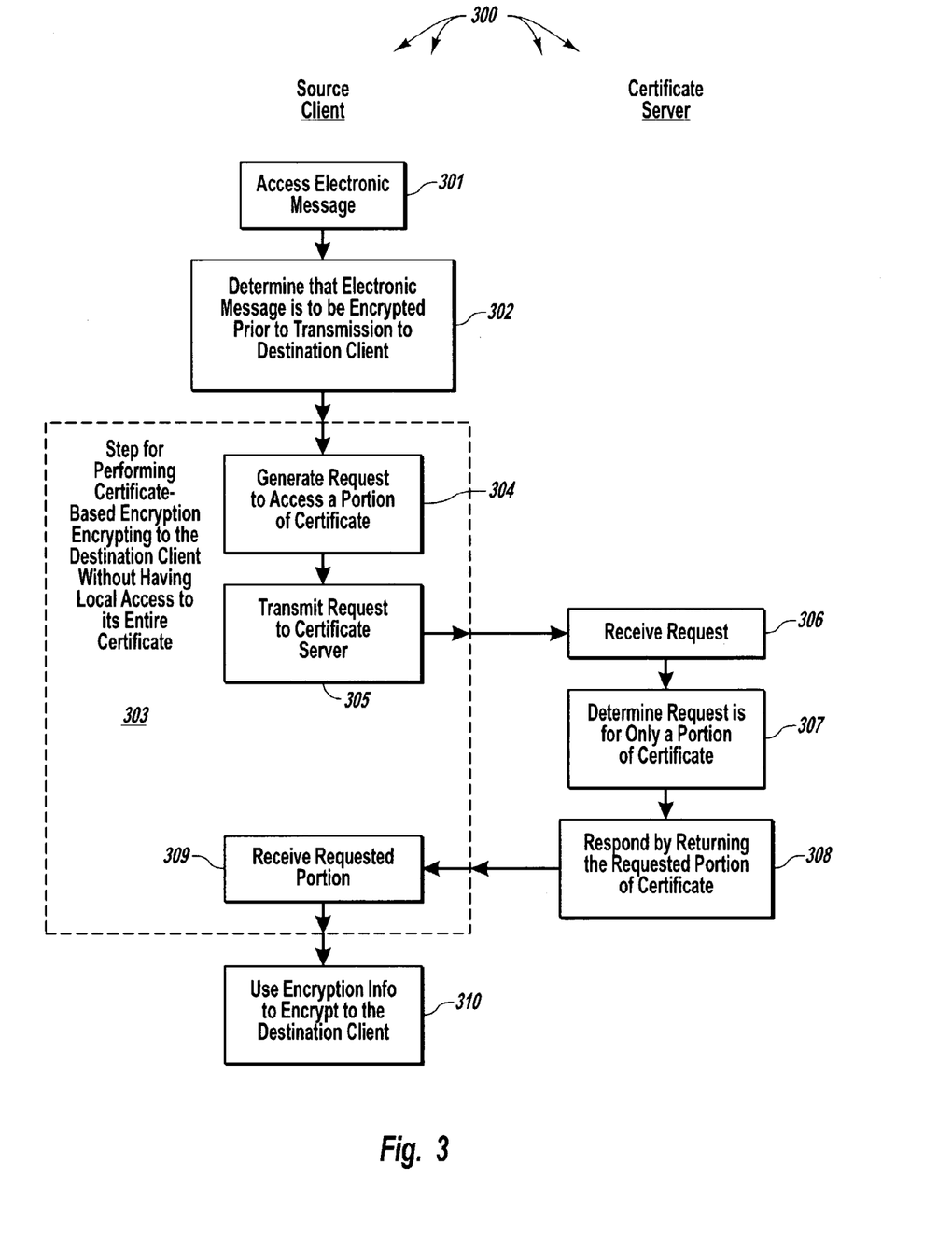
FIG. 3 illustrates a flowchart of a method for the source client to encrypt an electronic message to be send to one or more of the destination clients, and for the certificate server facilitating the same, in accordance with the principles of the present invention.

FIG. 3 illustrates a method 300 for the source client computing system encrypting a message to be sent to at least one of the destination clients with the assistance of the certificate server in accordance with the principles of the present invention. Some of the acts and a step of the method 300 may be performed by the source client 210 as represented under the left column of FIG. 3 under the heading "Source Client". Other acts of the method 300 are performed by the certificate server 220 as represented in the right column of FIG. 3 under the heading "Certificate Server".

The source client 210 first accesses an electronic message that it to be transmitted to at least one of the destination clients (act 301). The electronic message may be accessed from local memory, or perhaps received from another computing system for delivery to the destination computing system. Furthermore, the electronic message may be a preliminary version of the final version of the electronic message that is to be sent to the destination client.

The source client 210 then determines that the electronic message is to be encrypted before transmission to the destination client (act 302). This determination may be made in response to a configuration setting, a specific setting related to the destination client or a group of clients that the destination client belongs to, or perhaps in response to a request from a user of the source client.

The source client 210 then performs a functional, result-oriented step for performing certificate-based encryption encrypting to the destination client without having local access to the entire certificate corresponding to the destination client (step 303). This result-oriented step includes any corresponding acts for accomplishing this result. However, in the illustrated embodiment, the step 303 includes corresponding acts 304, 305 and 309.

Specifically, the source client 210 generates a request to access only a portion of a certificate corresponding to the destination client. That portion may be the certificate illustrated in FIG. 7 as partial certificate 700. The partial certificate 700 includes encryption information 701 needed to encrypt the electronic message so as to be decryptable by the destination client. The encryption information 701 of the partial certificate 700 may be similar to the encryption information 801 of the full certificate. For example, if the full certificate 800 was an X.509 certificate, the encryption information 701 may be a public key that corresponds to a private key in the possession of the destination client.

Figure 7:
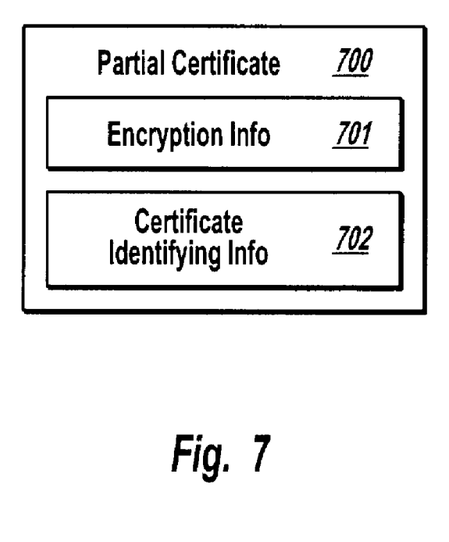
FIG. 7 illustrates a data structure of a partial certificate without the self-validation information in accordance with the principles of the present invention.

The partial certificate 700 may also include certificate identification information 702 that identifies the full certificate 800 corresponding to the partial certificate 700. The certificate identification information 702 may include, for example, at least a portion of the certificate identification information 802 of the full certificate. For example, if the full certificate 800 was an X.509 certificate, the certificate identification information 702 may include a key identifier, or alternatively or in addition, the combination of the certification issuer identifier and the certificate serial number. Although some of the validation information 803 may also be included in the partial certificate 700, none of the validation information 803 is illustrated as being contained by the partial certificate. Since the partial certificate 700 lack much of the information of the full certificate 800, the size of the partial certificate 700 may be much smaller than the size of the full certificate.

Figure 4:
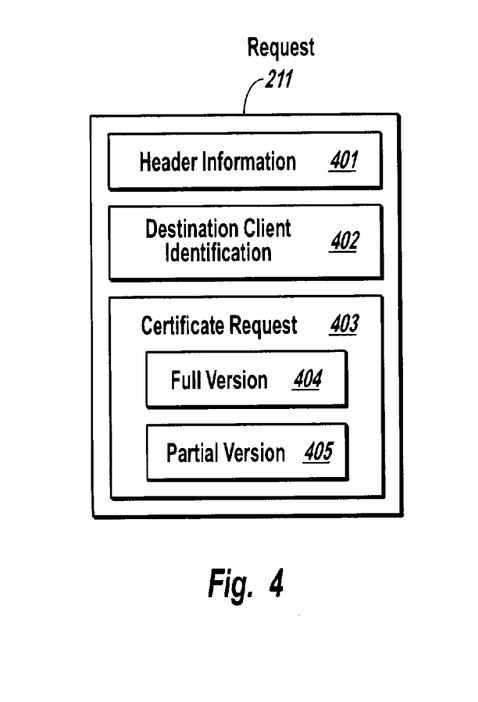
FIG. 4 illustrates a data structure of a request for a certificate in accordance with the principles of the present invention.

After the source client 210 generates the request to access a portion of the certification (act 304), the source client 210 transmits the request to the certificate server 220 (act 305). This transmission is represented in FIG. 2 by the request 211 moving from the source client 210 to the certificate server 220 as represented by the arrow 211A FIG. 4 schematically illustrates a data structure of a request 211 in accordance with the present invention. The request 211 includes header information 401. This header information 401 may include any information used by the transmission protocol. For example, if the electronic message is a HyperText Transport Protocol (HTTP) request (e.g., an HTTP POST request), the request 211A would include HTTP header information. The use of HTTP protocol to transmit the request is useful in cases where the certificate server 220 is not on a local network with the source client 210, but is instead accessible only over the Internet.

The request 211 also includes an identification of the destination client 402. This identification may be in the form of, for example, URLs, IP addresses, or e-mail addresses associated with the destination client or clients. If the identification was in the form of an unresolved name of an individual destination client, the certificate server 220 may also resolve the name to a particular destination client and provide that resolution back to the source client 210 at the same time that the requested partial or full certificate is provided by the certificate server to the source client. If the identification was in the form of an unresolved name of a distribution list, the certificate server may expand the distribution list, and then return either the partial or full certificate for each of the destination clients corresponding to the distribution list to the source client 210. Entities on a distribution list include individuals as well as potentially one or more other child distribution lists. Expansion of a distribution list means identifying each individual included in a distribution list by first including any individual directly identified in the distribution list, and then recursively performing the same expansion for any of the one or more other child distribution lists. Through this recursive process, all individuals in a distribution list are identified even if those individuals are only identified in a child or other descendant distribution list. Alternatively, such address name resolution may be accomplished separately by the certificate server 220 or by some other resolution server, not shown, and/or by a resolution mechanism internal to the source client 210.

The request 211 also includes a certificate request 403 that includes an indication of whether the full version of the certificate is requested (as represented by full version field 404) or whether a partial version of the certificate (as represented by partial version field 405) is requested. If there is more than one destination client corresponding to the certificate request, then the request may specify that the full version of the certificate is desired for all of the destination clients, or that the partial version of the certificate is desired for all of the destination clients. Alternatively, the request may specify that a partial certificate is to be returned for only a designated group of the destination clients, and that the full certificate is to be returned for the others. Furthermore, the request may specify that a full certificate is to be returned for only a designated group of the destination clients, and that the partial certificate is to be returned for the others. An example of a specific certificate request in the form of the "getcert" request that is now described.

The "getcert" command may be within an HTTP POST request and include the text "cmd=getcerts" to thereby identify that the request is for a certificate.

An address field "addrs=[ADDRESS]" may indicate a list of one or more addresses of one or more destination clients whose certificate is desired. When capitalized letters are included in squared brackets, that means that an actual value of the type described by the capitalized letters will replace the squared brackets and its contents in the message. For example, [ADDRESS] would be replaced by an actual address of the destination client, or an unresolved name to be resolved into an address by the certificate server. With the "getcerts" command, resolution data is not returned back to the client, only the certificate for the resolved address is returned.

An optional field "minicert=[t/f]" if set to true would cause the certificate server 220 to return the partial certificate rather than the full certificate. Otherwise, if the value was false or the minicert field was not present, the full certificate would be returned. The minicert field may correspond to a particular destination client represented by an addrs field or may represent some or all destination clients represented by an addrs field in the request.

The certificate server 220 receives the request from the source client 210 (act 306), determines that the request is for only the partial certificate (act 307), and then responds by returning only the partial certificate for the destination client (act 308). Referring to FIG. 2, the certificate server 220 returns response 212 to the source client 210 as represented by the arrow 212A.

Figure 5:
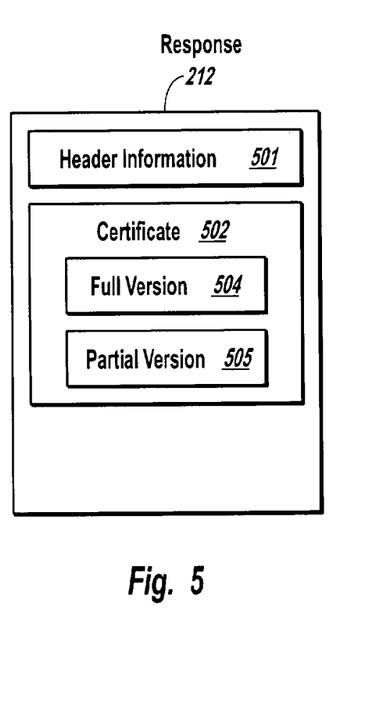
FIG. 5 illustrates a data structure of a response to the request in accordance with the principles of the present invention.

FIG. 5 illustrates an example data structure of the response 212. The response includes header information 501. For example, if the request 211 was an HTTP request, the response 212 may be an HTTP response, in which case, the header information would be HTTP response header information. The response also includes the certificate 503 for each of the destination clients of the electronic message. The certificate may be a full certificate as represented by element 504, or may be a partial certificate as represented by element 505. However, in accordance with the principles of the present invention, a partial certificate is returned for at least one of the destination clients to receive the electronic message.

The following represents one possible schema for the response embedded within an HTTP POST response (line number added for clarity):

```
1.    <a:response xmlns:a="http://schemas.microsoft.com/exchange/webmail">
2.       <a:cert>[CERTIFICATE]</a:cert>
3.    </a:response>
```

Lines 1 through 3 represent a "response" XML element. The attribute "xmlns" represents a namespace corresponding to the XML element and that may be used to parse and interpret and the meaning of the XML element.

Line 2 represents a "cert" XML element which may be repeated for each destination client (or group thereof in the case of the address being a distribution list) that was represented by an addrs field in the request.

The content of the cert element is the certificate or certificates corresponding to the addrs element and may take the following form (line numbers are added for clarity):
1. [DWORD: size of the whole content of the cert element]
2. [DWORD: total count of recipients for which the cert elements contains a certificate for (can be zero if the recipient was unresolved)]
3. [DWORD: total count of certificates found (can be zero if no valid certificates were found]
4. [certificate 1]
5. .
6. .
7. .
8. [certificate M]

Lines 1-3 are DWORDs representing information about the entire content of the cert element. Lines 4-8 represents that there may be multiple certificate sections. In this case, the certificate includes certificates 1 through M, where lines 5-7 are vertical ellipses representing a variable number of certificates between the first and M'th certificate. Each certificate section may be structured as follows (line numbering added for clarity):
1. [WORD: size of the certificate]
2. [WORD: flags (may indicate whether the certificate is a full or partial certificate and whether the certificate is identified with a key identifier]
3. [THE PARTIAL OR FULL CERTIFICATE ITSELF]

Returning back to the more general example of FIGS. 2 and 3, the source client 210 receives only the requested portion of the certificate from the server (act 309). At this stage, the source client 210 is now prepared to encrypt the electronic message for receipt by each of the destination clients that are to be sent the electronic message. Since only a partial certificate was returned for some, or even all, of the destination clients to be sent the electronic message, and since the partial certificate is much smaller (maybe even by an order of magnitude) than the full certificate, the certificate may be delivered much faster and using less bandwidth from the certificate server 220 to the source client.

The source client then uses the encryption information within the partial certificate to encrypt the electronic message. As previously mentioned, the encryption information 701 represented in the partial certificate 700 of FIG. 7. The encryption information may be, for example, a public key corresponding to the destination client that is to be sent the electronic message.

If the electronic message was to be sent to multiple destination clients, the electronic message may be encrypted for each destination client. This may be accomplished by separately encrypting the content for each destination client using the corresponding public key for each destination client. However, if there were many destination clients, this could be a highly processor intensive task and might result in a high memory and bandwidth usage in delivering the electronic message.

Figure 6:
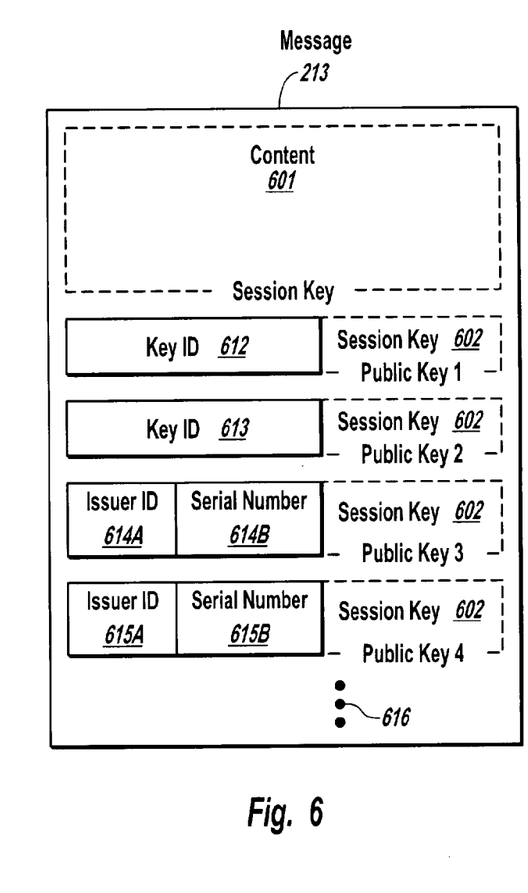
FIG. 6 illustrates a data structure of an electronic message encrypted using the certificate (or a portion thereon) in accordance with the principles of the present invention.

In order to reduce processor, memory, and bandwidth requirements, the electronic message may be alternatively structured like the electronic message 600 illustrated in FIG. 6. The content 601 of the electronic message is encrypted using a session key 602. Each destination client is informed of the session key 602 by encrypting the session key 602 using the public key corresponding to that destination client. For example, suppose that the electronic message 600 is to be sent to each of destination clients 231 through 234 having respective public keys 1 through 4. In that case, the session key 602 would be encrypted separately with public keys 1 through 4.

The key identifier 612 is associated with the session key 602 that was encrypted using the public key 1 identified by the key identifier 612. The key identifier 613 is associated with the session key 602 that was encrypted using the public key 2 identified by the key identifier 613. The combination of the issuer identifier 614A and serial number 614B are associated with the session key 602 that was encrypted using the public key 3 that is unique to the combination 614A and 614B. The combination of the issuer identifier 615A and serial number 615B are associated with the session key 602 that was encrypted using the public key 4 that is unique to the combination 615A and 615B. Upon receiving the message 213, each destination client may use the key identifier, or combination of issuer identifier and serial number, to determine which encrypted form of the session key it is able to decrypt. The destination client then decrypts that session key, and uses the session key to decrypt the content.

Accordingly, because secure communication is enabled using reduced-size certificates, memory, processor, and network bandwidth resource are preserved and the time required to send a secure electronic message is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

The invention claimed is:

1. In a network environment that includes a source client and a plurality of destination clients, the source client being capable of sending electronic messages to the plurality of destination clients, the network environment including one or more certificate servers that are capable of validating and providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, a method for the source client encrypting a message to be sent to at least one of the destination clients, the method comprising the following:
    an act of the source client accessing an electronic message to be transmitted to a destination client of the plurality of destination clients;
    an act of determining that the electronic message is to be encrypted before transmission to the destination client;
    an act of generating a request for a partial certificate, the partial certificate comprising only a portion, but not the entirety, of a certificate corresponding to the destination client, the portion including encryption information needed to encrypt the electronic message so as to be decryptable by the destination client;
    an act of transmitting the request to the certificate server;
    an act of receiving only the requested portion of the certificate from the certificate server; and
    an act of using the encryption information to encrypt the electronic message.

2. A method in accordance with claim 1, wherein the request to access only a portion of a certificate is a Hyper-Text Transport Protocol (HTTP).

3. A method in accordance with claim 1, wherein the requested portion of the certificate does not include self-validation information to allow for a determination that the certificate does indeed correspond to the corresponding destination client and has not been revoked.

4. A method in accordance with claim 3, wherein validation is performed by the certificate server, where the certificate server is trusted by the source client.

5. A method in accordance with claim 1, further comprises the following:
    an act of transmitting the encrypted electronic message to the destination client.

6. A method in accordance with claim 1, wherein the requested portion of the certificate includes the public key of the destination client.

7. A method in accordance with claim 6, wherein the encrypted electronic message includes the following:
    a first data field that represents the electronic message encrypted using a session key; and
    a second data field that represents the session key encrypted using the public key.

8. A method in accordance with claim 6, wherein the requested portion further includes the certificate issuer and serial number of the certificate.

9. A method in accordance with claim 8, wherein the encrypted electronic message includes the following:
    a first data field that represents the electronic message encrypted using a session key; and
    a second data field that represents the session key, the certificate issuer, and the serial number encrypted using the public key.

10. A method in accordance with claim 6, wherein the requested portion further includes the key identifier of the certificate.

11. A method in accordance with claim 10, wherein the encrypted electronic message includes the following:
    a first data field that represents the electronic message encrypted using a session key; and
    a second data field that represents the session key and key identifier encrypted using the public key.

12. In a network environment that includes a source client and a plurality of destination clients, the source client being capable of sending electronic messages to the plurality of destination clients, the network environment including one or more certificate servers that are capable of validating and providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, a method for the source client encrypting a message to be sent to at least one of the destination clients, the method comprising the following:
    an act of the source client accessing an electronic message to be transmitted to a destination client of the plurality of destination clients;
    an act of determining that the electronic message is to be encrypted before transmission to the destination client;
    an act of generating a request to access only a portion of a certificate corresponding to the destination client, the portion including encryption information needed to encrypt the electronic message so as to be decryptable by the destination client;
    an act of transmitting the request to the certificate server;
    an act of receiving only the requested portion of the certificate from the certificate server; and
    an act of using the encryption information to encrypt the electronic message;
    wherein the destination client is a first destination client that is to be send an encrypted form of the electronic message, and the certification corresponding to the first destination client is a first certificate, wherein the electronic messages is also to be transmitted to a second destination client, the method further comprising the following:

an act of determining that the electronic message is to be encrypted before transmission to the second destination client;

an act of generating a request to access only a portion of a second certificate corresponding to the second destination client, the portion including encryption information needed to encrypt the electronic message so as to be decryptable by the second destination client;

an act of transmitting the request to the certificate server;

an act of receiving only the requested portion of the second certificate from the certificate server; and an act of using the encryption information in the second certificate to encrypt the electronic message.

13. A method in accordance with claim 12, wherein the request to access the portion of the first certificate and the request to access the portion of the second certificate are the same request.

14. A method in accordance with claim 12, further comprising the following:

an act of transmitting the encrypted electronic message.

15. In a network environment that includes a source client and a plurality of destination clients, the source client being capable of sending electronic messages to the plurality of destination clients, the network environment including one or more certificate sewers that are capable of validating and providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, a method for the source client encrypting a message to be sent to at least one of the destination clients, the method comprising the following:

an act of the source client accessing an electronic message to be transmitted to a destination client of the plurality of destination clients;

an act of determining that the electronic message is to be encrypted before transmission to the destination client;

an act of generating a request to access only a portion of a certificate corresponding to the destination client, the portion including encryption information needed to encrypt the electronic message so as to be decryptable by the destination client;

an act of transmitting the request to the certificate server;

an act of receiving only the requested portion of the certificate from the certificate server; and an act of using the encryption information to encrypt the electronic message;

wherein the destination client is a first destination client that is to be send an encrypted form of the electronic message, and the certification corresponding to the first destination client is a first certificate, wherein the electronic messages is also to be transmitted to a second destination client, the method further comprising the following:

an act of determining that the electronic message is to be encrypted before transmission to the second destination client;

an act of generating a request to access the entire second certificate corresponding to the second destination client;

an act of transmitting the request to the certificate server;

an act of receiving the entire second certificate from the certificate server; and an act of using the encryption information in the second certificate to encrypt the electronic message.

16. A method in accordance with claim 15, wherein the request to access the portion of the first certificate and the request to access the portion of the second certificate are the same request.

17. A computer program product for use in a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, the computer program product comprising one or more computer-readable media having thereon computer-executable instructions that, when executed by one or more processors at the source client, cause the source client to perform the method as recited in claim 1.

18. A computer program product in accordance with claim 17, wherein the one or more computer-readable media further have thereon computer-executable instructions that, when executed by the one or more processors at the source client, further cause the source client to perform the following:

an act of transmitting the encrypted electronic message to the destination client.

19. A computer program product for use in a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, the computer program product comprising one or more computer-readable media having thereon computer-executable instructions that, when executed by one or more processors at the source client, cause the source client to do the following:

an act of the source client accessing an electronic message to be transmitted a destination client of the plurality of destination clients;

an act of determining that the electronic message is to be encrypted before transmission to the destination client;

an act of generating a request to access only a portion of a certificate corresponding to the destination client, the portion including encryption information needed to encrypt the electronic message so as to be decryptable by the destination client;

an act of transmitting the request to the certificate server;
an act of receiving only the requested portion of the certificate from the certificate server; and
an act of using the encryption information to encrypt the electronic message;
wherein the destination client is a first destination client that is to be send an encrypted form of the electronic message, and the certification corresponding to the first destination client is a first certificate, wherein the electronic messages is also to be transmitted to a second destination client, the one or more computer-readable media further having thereon computer-executable instructions that, when executed by the one or more processors at the source client, further cause the source client to perform the following:
an act of determining that the electronic message is to be encrypted before transmission to the second destination client;
an act of generating a request to access only a portion of a second certificate corresponding to the second destination client, the portion including encryption information needed to encrypt the electronic message so as to be decryptable by the second destination client;
an act of transmitting the request to the certificate server;
an act of receiving only the requested portion of the second certificate from the certificate server; and
an act of using the encryption information in the second certificate to encrypt the electronic message.

20. A computer program product in accordance with claim 19, wherein the request to access the portion of the first certificate and the request to access the portion of the second certificate are the same request.

21. A computer program product for use in a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, the computer program product comprising one or more computer-readable media having thereon computer-executable instructions that, when executed by one or more processors at the source client, cause the source client to do the following:
an act of the source client accessing an electronic message to be transmitted a destination client of the plurality of destination clients;
an act of determining that the electronic message is to be encrypted before transmission to the destination client;
an act of generating a request to access only a portion of a certificate corresponding to the destination client, the portion including encryption information needed to encrypt the electronic message so as to be decryptable by the destination client;
an act of transmitting the request to the certificate server;
an act of receiving only the requested portion of the certificate from the certificate server; and
an act of using the encryption information to encrypt the electronic message;
wherein the destination client is a first destination client that is to be send an encrypted form of the electronic message, and the certification corresponding to the first destination client is a first certificate, wherein the electronic messages is also to be transmitted to a second destination client, the one or more computer-readable media further having thereon computer-executable instructions that, when executed by one or more processors at the source client, cause the source client to perform the following:
an act of determining that the electronic message is to be encrypted before transmission to the second destination client;
an act of generating a request to access the entire second certificate corresponding to the second destination client;
an act of transmitting the request to the certificate server
an act of receiving the entire second certificate from the certificate server; and
an act of using the encryption information in the second certificate to encrypt the electronic message.

22. A computer program product in accordance with claim 17, wherein the one or more computer-readable media are physical media.

23. A computer program product in accordance with claim 17, wherein the one or more computer-readable media comprises at least in part run-time memory.

24. A computer program product in accordance with claim 17, wherein the one or more computer-readable media comprise persistent memory.

25. In a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, a method for the source client encrypting a message to be sent to at least one of the destination clients, the method comprising the following:
an act of the source client accessing an electronic message to be transmitted a destination client of the plurality of destination clients;
an act of determining that the electronic message is to be encrypted before transmission to the destination client;
a step for performing certificate-based encryption encrypting to the destination client, having local access to a partial certificate but without having local access to the entire certificate corresponding to the destination client.

26. A method in accordance with claim 25, wherein the step for performing certificate-based encryption encrypting to the destination client without having local access to the entire certificate corresponding to the destination client comprises the following:
an act of generating a request to access only a portion of a certificate corresponding to the destination client, the portion including encryption information needed to encrypt the electronic message so as to be decryptable by the destination client;
an act of transmitting the request to the certificate server;
an act of receiving only the requested portion of the certificate from the certificate server; and
an act of using the encryption information to encrypt the electronic message.

27. In a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, a method for the certificate server helping the source client to encrypt a message to be sent to at least one of the destination clients, the method comprising the following:

an act of receiving a request from the source client;

an act of determining that the request is for a partial certificate, the partial certificate comprising only a portion, but not the entirety, of a certificate corresponding to the destination client, the portion including encryption information needed to encrypt the electronic message so as to be decryptable by the destination client; and an act of responding to the request from the source client by returning the requested portion of the certificate to the source client.

28. A method in accordance with claim 27, wherein the request is an HTTP request.

29. In a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, a method for the certificate server helping the source client to encrypt a message to be sent to at least one of the destination clients, the method comprising the following:

an act of receiving a request from the source client;

an act of determining that the request is to access only a portion of a certificate corresponding to the destination client, the portion including encryption information needed to encrypt the electronic message so as to be decryptable by the destination client; and an act of responding to the request from the source client by returning the requested portion of the certificate to the source client wherein the destination client is a first destination client and the certificate is a first certificate, the method further comprising the following:

an act of determining that the request is also to access only a portion of a second certificate corresponding to the second destination client, the encryption information needed to encrypt the electronic message so as to be decryptable by the second destination client; and an act of responding to the request from the source client by returning the requested portion of the second certificate to the source client.

30. A method in accordance with claim 29, wherein the requested portion of the first certificate and the requested portion of the second certificate are returned in the same response to the request.

31. A method in accordance with claim 30, wherein the response is an HTTP response.

32. A computer program product for use in a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, the computer program product for implementing a method for the certificate server helping the source client to encrypt a message to be sent to at least one of the destination clients, the computer program product comprising one or more computer-readable media having thereon computer-executable that, when executed by one or more processors at the certificate server, cause the certificate server to perform the following:

an act of receiving a request from the source client;

an act of determining that the request is for a partial certificate, the partial certificate comprising only a portion, but not the entirety, of a certificate corresponding to the destination client, the portion including encryption information needed to encrypt the electronic message so as to be decryptable by the destination client; and an act of responding to the request from the source client by returning the requested portion of the certificate to the source client.

33. A computer program product for use in a network environment that includes a source client and a plurality of destination clients, the source client being capable of sending electronic messages to the plurality of destination clients, the network environment including a certificate server that is capable of providing certificates for at least some of the one or more destination clients to the source client, each certificate including encryption information needed to encrypt to the corresponding destination client, and including self-verification information to allow for a determination that the certificate does indeed correspond to the corresponding destination client and has not been revoked, the computer program product for implementing a method for the certificate server helping the source client to encrypt a message to be sent to at least one of the destination clients, the computer program product comprising one or more computer-readable media having thereon computer-executable that, when executed by one or more processors at the certificate server, cause the certificate server to perform the following:

an act of receiving a request from the source client;

an act of determining that the request is to access only a portion of a certificate corresponding to the destination client, the portion including encryption information needed to encrypt the electronic message so as to be decryptable by the destination client; and an act of responding to the request from the source client by returning the requested portion of the certificate to the source client;

wherein the destination client is a first destination client and the certificate is a first certificate, the one or more computer-readable media further having thereon computer-executable instructions that, when executed by the one or more processors at the certificate server, further cause the certificate server to perform the following:

an act of determining that the request is also to access only a portion of a second certificate corresponding to the second destination client, the encryption information needed to encrypt the electronic message so as to be decryptable by the second destination client; and an act of responding to the request from the source client by returning the requested portion of the second certificate to the source client.

34. A computer program product in accordance with claim 32, wherein the one or more computer-readable media are physical media.

35. A computer program product in accordance with claim 34, wherein the one or more computer-readable media comprise at least in part run-time memory.

36. A computer program product in accordance with claim 34, wherein the one or more computer-readable media comprise persistent memory.

* * * * *